Patented July 20, 1954

2,684,354

UNITED STATES PATENT OFFICE 2,684,354

REACTION PRODUCT OF COHYDROLYZATE OF PHENYL AND ETHYL SILICON TRIHALIDES AND PENTAERYTHRITOL

John E. Dereich, Painesville, Ohio, assignor to Diamond Alkali Company, Cleveland, Ohio, a corporation of Delaware No Drawing. Application March 22, 1952, Serial No. 278,134

6 Claims. (Cl. 260—46.5)

This invention relates to siloxane materials and to a method of making the same. It more particularly relates to siloxanes comprising condensed co-hydrolyzates of phenyl and ethyl silicon trihalides, which condensed co-hydrolyzates are characterized by intermolecular condensation with a modifying hydroxy-containing material in relatively small amount with respect to said condensed co-hydrolyzates, which modifying material much improves the processing characteristics of the co-hydrolyzates and, moreover, produces an ultimate product having enhanced heat stability and other desirable properties.

The condensation products of the co-hydrolyzates of phenyl and ethyl silicon trihalides mentioned above are described in the co-pending application of Alfred Hirsch, Ser. No. 254,431, filed November 1, 1951, and more particularly comprise the condensed co-hydrolyzate of ethyl silicon trihalide and phenyl silicon trihalide, wherein the ethyl silicon trihalide is present in an amount of at least 10 mol per cent and less than 30 mol per cent of the total mixture. These materials may suitably be prepared by physically combining an ethyl silicon trihalide and a phenyl silicon trihalide in suitable proportions as noted above, hydrolyzing the mixture by any desired means, and isolating a partially condensed co-hydrolyzate of the phenyl silicon trihalide and the ethyl silicon trihalide preferably in a solvent. The solvent may be any suitable material, preferably organic, in which this partially condensed co-hydrolyzate is soluble and in which the modifying substance to be described below is soluble, as will be well-understood by those skilled in the art, but for convenience will be described specifically with respect to an isopropyl ether solution, as that has been found convenient for the subsequent steps of the invention.

Thus, a suitable starting material for the co-hydrolyzate portion of phenyl and ethyl silicon trihalides of the present composition is an isopropyl ether solution of the partially condensed co-hydrolyzate of the phenyl and ethyl silicon trihalides, as described above. As noted in the cross-referenced case of Hirsch, the chlorides are the preferable species of the halide genus in view of their easy availability and ready reactivity in the environment described. A particularly suitable species with respect to the amounts in combination of the phenyl and ethyl portions of the material, respectively, is that wherein the ethyl substituent is present substantially to the extent of 20 mol per cent, the remainder of the composition being the phenyl portion thereof, which is present substantially in the amount of 80 mol per cent. This combination, when hydrolyzed by any of a vast variety of means, it being apparent that the method of hydrolysis is without effect upon the ultimate properties of the composition, yields, when ultimately condensed, a hard, tough resin of high heat-resistant properties which has various uses in the art.

It has now been found, however, that despite the advantageous properties of the above-described material, an improvement thereon may be effected, particularly with respect to heat resistance. The emphasis on heat resistance is, of course, understandable as these resins generally are in great demand as binders in service where high temperatures are encountered, either by conduction or from friction or the like, and, accordingly, any increase in the heat resistance of the resins, while still maintaining the valuable and essentially organic properties which render the resins so valuable, is advantageous.

The present invention may more completely be understood by considering the hydrolysis reaction of compounds of the general formula $RSiX_3$, wherein the general formula represents a mixture of alkyl and aryl silicon trihalides, in this case, phenyl and ethyl silicon trihalides, in the proportions noted above, and X being a halogen, in this case, bromine or chlorine, but suitably chlorine in view of its easy availability and in view of the simplicity of the reaction involved. When such a compound, e. g., $RSiX_3$, is subjected to a hydrolysis reaction, either in the presence of water or by other suitable means which have heretofore been disclosed in the art, e. g., tertiary butanol and the like, the halogens of the molecule are replaced by the residue of a compound having hydrogen available to combine with the halogen. In the case of water, this residue is a hydroxyl group, and in the case of, for example, tertiary butanol, there appears to be an intermediate stage in which a tertiary butoxy group is attached to silicon, with the attendant formation of HCl. This HCl may then react with tertiary butanol to form water and tertiary butyl chloride. The water is then avalable to enter into two competing hydrolysis reactions, i. e., that of the hydrolysis of the tertiary butoxy group or a chlorine atom attached to silicon.

In the case of water hydrolysis, this will ultimately produce a compound at least theoretically of the form of $RSi(OH)_3$. It is a well-understood phenomenon that this compound is relatively unstable and tends to undergo intermolecular condensation, splitting out water, and establishing Si-O-Si linkages. It is to the modification of this second reaction, i. e., the intermolecular condensation, to which the present invention is directed.

The high heat stability and relative inertness of various of the siloxanes, particularly those derived from mono-organo-substituted materials, such as RSiX₃, are grounded to a considerable extent upon the completion of not only the hydrolysis reaction, which tends to proceed instantaneously, but more importantly upon the condensation reaction in which the hydroxyl groups of the co-hydrolyzate interact to form water and establish Si-O-Si linkages. The greater percentage of the hydroxyl groups reacting in the intermolecular condensation between adjacent molecules does so substantially spontaneously, but the last small percentage of the hydroxyl groups in the compounds interact somewhat more difficultly, as witness the further heating required to complete the condensation reaction in accordance with, for example, the application of Hirsch, cross-referenced above. Moreover, when the compounds have been subjected to further heating, which is necessary to obtain this interaction of the remaining hydroxyl groups, the cure, though complete, is not entirely satisfactory because the materials are relatively brittle and, therefore, are subject to damage from mechanical or thermal shock.

The present invention solves the problem of inducing the interaction of the last small percentage of the hydroxyl groups of the partially condensed co-hydrolyzate in the condensation by adding to the compounds a small amount of a material which itself has available a large number of hydroxyl groups and which, moreover, amounts to a very small addition of organic material to the predominately inorganic highly heat-resistant siloxane. In fact, it is a feature of the present invention that even though the additive preferred is itself predominately of an organic character, nevertheless, a material is obtained in the ultimate condensation at relatively low temperatures and in a relatively short time, especially compared with the unmodified materials described in the said application of Hirsch, which material has higher heat resistance and superior toughness, resiliency, and the like than the heretofore taught unmodified materials.

In accordance with the principles of the present invention, a mixture of 10–30 mol per cent of an ethyl silicon trihalide, suitably ethyl silicon trichloride, with a corresponding 70–90 mol per cent of a phenyl silicon trihalide, suitably phenyl silicon trichloride, to make 100 mol per cent, is added to a hydrolyzing medium, such as water or tertiary butanol, as noted above, and in a suitable solvent, such as isopropyl ether, and upon the mixing being satisfactorily completed and hydrolysis going forward at a relatively low temperature, the aqueous and non-aqueous phases are separated and the non-aqueous hydrolyzate phase washed to remove residual acid or alcohol. Pentaerythritol in an amount between 3½%–12% of the siloxane material present in the hydrolyzate phase, i. e., based upon the completely condensed siloxane, and suitably between 4% and 7%, ideally 5%, is added to the washed hydrolyzate solution. This mixture is then combined with water and a common solvent for the water and ether, and the mixture refluxed for about 5–30 minutes, after which the aqueous and non-aqueous phases are separated, the modified hydrolyzate being in solution in the non-aqueous phase. The solvent may then be removed from this solution to recover the partially condensed, modified co-hydrolyzate. If the solvent is removed from a relatively thin layer of the solution supported on a suitable substrate, and the residue is heated at about 100° C. for about one-half hour, an observably tough, resilient, non-crazed film is obtained.

This material may be used as is, or, if desired, may be ground and employed as a molding powder alone or in combination with conventional fillers, and molded at suitable temperatures and pressures. The moldings obtained, whether filled or unfilled, are found to be considerably improved in properties over those obtained in accordance with the teachings of the application of Hirsch, are substantially unaffected by water even upon extended immersion therein, and, moreover, are characterized by relatively light, amber color, and high heat resistance.

Thus, in contrast to the materials described in the aforesaid application of Hirsch, the present materials are substantially completely cured in the course of their molding, whereby the steps of cooling the mold prior to removing the molding therefrom, and further heating of the molding to complete the cure, are not necessary. Thus, the materials of the present invention are suitably molded at 1000 to 3000 p. s. i. pressure and at a temperature of the order of 200°–250° C. for a period of the order of 20–60 minutes. The molding may be removed from the mold without appreciable cooling, i. e., may be removed at 200° C., and at that temperature is hard and of a tough, crack-resistant nature. Such a molding is of clear amber color and is without apparent defects. Further testing indicates the character of the heat resistance of the material in that heating the material at 360° C. for a period of four hours is without effect thereon, and a further period of heating for four hours at 400° C. causes only a slight darkening in color.

In order that those skilled in the art may more fully understand the character of the invention herein, the following specific example is offered:

*Example*

20 parts of an isopropyl ether solution containing 12 parts of a mixed co-hydrolyzate of 20 mol per cent of ethyl silicon trichloride and 80 mol per cent of phenyl silicon trichloride are mixed with 5 parts of pentaerythritol. Thirty parts of water and 30 parts of dioxane are added to the mixture, which is then heated in a suitable flask fitted with a condenser. The mixture is maintained at reflux temperature for ten minutes. After cooling, the ether solution is separated from the water, washed with cold water, again separated, and dried with anhydrous sodium sulfate. This solution is clear and amber in color. A small portion of the solution is placed in an aluminum dish, together with 0.05 part of triethanolamine as a catalyst, and the dish heated to remove the solvent. A clear, continuous film forms rapidly and is easily lifted intact from the aluminum dish. The film is subjected to heating at 180° C. overnight, and the toughness and tenacity thereof is found to be considerably increased by this treatment.

With the remainder of the solution noted above, a molding powder is prepared by evaporating the solvent and heating the residue for a period of three hours at 150° C. and by grinding the resulting resinous product. This material is subjected to further heating at 170° C. for three hours and thereafter is molded at 3000 p. s. i. at 235° C. for a period of thirty minutes. The molding is then removed at 200° C. and is found to be clear, amber in color, free of any cracks and apparent defects, and of considerable toughness and tenacity. The molding, moreover, is not brittle. It is possible to subject the molding to substantial mechanical shock without resulting in any cracking, crazing, or chipping. The molding is also found to be unaffected by additional heating for four hours at 400° C.

While there has been described an embodiment of the invention, the products described are not intended to be understood as limiting the scope of the invention and it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The reaction product of a cohydrolyzate of between 10 and 30 mol per cent of ethyl silicon trihalide and 70 and 90 mol per cent of phenyl silicon trihalide with from between 3½ to 12 per cent of pentaerythritol.

2. The product of claim 1 wherein the trihalides are trichlorides.

3. The product of claim 1 wherein between 4 and 7 per cent of pentaerythritol is employed.

4. The product of claim 1 wherein 5 per cent of pentaerythritol is employed.

5. A siloxane composition, being the condensed co-hydrolyzate of a mixture of from 10 to 30 mol per cent of ethyl silicon trichloride and 70 to 90 mol per cent of phenyl silicon trichloride to make 100 per cent, with 5 per cent of pentaerythritol, said composition being characterized by substantial absence of sensitivity to water, and by substantial stability at temperatures of the order of 360–400° C.

6. The product of claim 5 wherein 20 mol per cent of ethyl silicon trichloride and 80 mol per cent of phenyl silicon trichloride are employed.

References Cited in the file of this patent

UNITED STATES PATENTS

| Number | Name | Date |
|---|---|---|
| 2,584,343 | Goodwin et al. | Feb. 5, 1952 |

FOREIGN PATENTS

| Number | Country | Date |
|---|---|---|
| 659,009 | Great Britain | Oct. 17, 1951 |